United States Patent
Lee et al.

(10) Patent No.: US 8,472,381 B1
(45) Date of Patent: Jun. 25, 2013

(54) METHODS AND APPARATUS FOR ANTENNA SPOOFING

(75) Inventors: Jungwon Lee, San Diego, CA (US); Jihwan P. Choi, San Jose, CA (US); Hui-Ling Lou, Sunnyvale, CA (US); Yakun Sun, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 313 days.

(21) Appl. No.: 12/856,421

(22) Filed: Aug. 13, 2010

Related U.S. Application Data

(60) Provisional application No. 61/234,190, filed on Aug. 14, 2009.

(51) Int. Cl.
*H04W 4/00* (2009.01)

(52) U.S. Cl.
USPC ............ 370/328; 370/338; 370/335; 370/442

(58) Field of Classification Search
USPC .................. 370/208, 310, 328, 329, 330, 338, 370/335, 442
See application file for complete search history.

(56) References Cited

U.S. PATENT DOCUMENTS

| | | | | |
|---|---|---|---|---|
| 7,809,074 | B2 * | 10/2010 | Kotecha et al. | 375/267 |
| 7,822,128 | B2 * | 10/2010 | Maltsev et al. | 375/260 |
| 7,916,620 | B2 * | 3/2011 | Park et al. | 370/203 |
| 7,920,533 | B2 * | 4/2011 | Koo et al. | 370/338 |
| 8,019,016 | B1 * | 9/2011 | Lee et al. | 375/299 |
| 8,073,486 | B2 * | 12/2011 | Mundarath et al. | 455/553.1 |
| 8,130,864 | B1 * | 3/2012 | Lee et al. | 375/296 |
| 8,175,538 | B1 * | 5/2012 | Chen et al. | 455/69 |
| 8,217,834 | B2 * | 7/2012 | Wen et al. | 342/373 |
| 8,295,263 | B1 * | 10/2012 | Chen et al. | 370/345 |
| 2006/0098760 | A1 * | 5/2006 | Shen et al. | 375/299 |
| 2006/0264645 | A1 * | 11/2006 | Zhou et al. | 548/335.1 |
| 2007/0160011 | A1 * | 7/2007 | Kim et al. | 370/332 |
| 2007/0249296 | A1 * | 10/2007 | Howard et al. | 455/101 |
| 2008/0101493 | A1 * | 5/2008 | Niu et al. | 375/267 |
| 2008/0187062 | A1 * | 8/2008 | Pan et al. | 375/260 |

OTHER PUBLICATIONS

Anderson, "Paired and Unpaired Spectrum," in *LTE—The UMTS Long Term Evolution: From Theory to Practice*, pp. 573-583 (Sesia et al. eds., John Wiley & Sons 2009).

Barry et al., *Digital Communication*, pp. 548-551 (Kluwer Academic Pubs. 2004).

3GPP TS 36.212 V8.7.0 (May 2009) "Technical Specification; 3rd Generation Partnership Project; Technical Specification Group Radio Access Network; Evolved Universal Terrestrial Radio Access (E-UTRA); Multiplexing and channel coding (Release 8)," *3rd Generation Partnership Project* (2009).

3GPP TS 36.213 V8.7.0 (May 2009) "Technical Specification; 3rd Generation Partnership Project; Technical Specification Group Radio Access Network; Evolved Universal Terrestrial Radio Access (E-UTRA); Physical layer procedures (Release 8)," *3rd Generation Partnership Project* (2009).

* cited by examiner

*Primary Examiner* — Ricky Ngo
*Assistant Examiner* — DeWanda Samuel

(57) ABSTRACT

In a method for utilizing beamforming in a wireless communication system, reference signals corresponding to a first communication channel from a first communication device to a second communication device are received, and an estimate of the first communication channel is generated using the received reference signals. One or more transmit beamforming vectors are calculated using the estimate of the first communication channel, and the one or more transmit beamforming vectors are utilized to transmit signals via a second communication channel from the second communication device to the first communication device while the first communication device assumes that the first second communication device is not utilizing beamforming.

18 Claims, 6 Drawing Sheets

METHODS AND APPARATUS FOR ANTENNA SPOOFING

CROSS-REFERENCES TO RELATED APPLICATIONS

This disclosure claims the benefit of U.S. Provisional Patent Application No. 61/234,190, entitled "Antenna Spoofing Techniques for MIMO Systems," filed on Aug. 14, 2009, which is hereby incorporated by reference herein in its entirety.

FIELD OF THE DISCLOSURE

The present disclosure relates generally to communication systems and, more particularly, to communication devices that utilize multiple antennas.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some communication systems, one or more communication devices employ multiple antennas. When a transmitter with multiple antennas does not have information regarding a multiple-input, multiple-output (MIMO) or multiple-input, single-output (MISO) channel between the transmitter and a receiver, the transmitter may employ transmit diversity. For example, a transmitter utilizes delay diversity by transmitting a signal via a first transmitter and transmitting a time-delayed version of the signal via a second transmitter. As another example, a transmitter utilizes delay diversity by transmitting a signal via a first transmitter and a transmitting a frequency-offset version of the signal via a second transmitter. With antenna switching, a transmitter may choose a "best" antenna from a plurality of antennas, and then transmit using only the chosen antenna.

When a transmitter has MIMO or MISO channel information, the transmitter may develop a beamforming vector using the channel information to apply complex-valued weights at each antenna to steer a beam towards the receiver.

SUMMARY

In one embodiment, a method for utilizing beamforming in a wireless communication system includes receiving reference signals corresponding to a first communication channel from a first communication device to a second communication device, and generating an estimate of the first communication channel using the received reference signals. The method also includes calculating one or more transmit beamforming vectors using the estimate of the first communication channel, and utilizing the one or more transmit beamforming vectors to transmit signals via a second communication channel from the second communication device to the first communication device while the first communication device assumes that the first second communication device is not utilizing beamforming.

In another embodiment, an apparatus for utilizing beamforming in a wireless communication system comprises a channel estimator to generate an estimate of a first communication channel from a first communication device to a second communication device that includes the apparatus, the channel estimator to generate the estimate of the first communication channel using reference signals received from the first communication device via the first communication channel. The apparatus additionally comprises a transmit beamforming calculator to calculate one or more beamforming vectors based on an output of the channel estimator, and a beamforming unit to utilize the one or more transmit beamforming vectors on signals to be transmitted via a second communication channel from the second communication device to the first communication device. Also, the apparatus comprises a controller to cause the beamforming unit to utilize the one or more transmit beamforming vectors on signals to be transmitted via the second communication channel while the first communication device assumes that the first second communication device is not utilizing beamforming.

In yet another embodiment, a method for utilizing beamforming in a wireless communication system includes receiving reference signals corresponding to a first communication channel from a first communication device to a second communication device, and generating an estimate of the first communication channel using the received reference signals. Additionally, the method includes calculating a plurality of transmit beamforming vectors using the estimate of the first communication channel, and utilizing each one of the plurality of transmit beamforming vectors to transmit a respective sounding signal via a second communication channel from the second communication device to the first communication device while the first communication device assumes that the first second communication device is utilizing a respective single antenna to transmit each sounding signal.

DETAILED DESCRIPTION

In embodiments described below, a wireless network device such as an evolved node base device (eNB) of a communication network transmits to and receives from one or more other wireless network devices, such as a user equipment device (UE). eNB and UE correspond to terminology used in the 3$^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems utilize embodiments of apparatus and methods described herein such as communication systems that conform to the IEEE 802.16 Standard, wireless local area network (WLAN) systems such as systems that conform to the IEEE 802.11n Standard, etc. For ease of explanation, the description below refers to eNBs and UEs.

Figure 1:
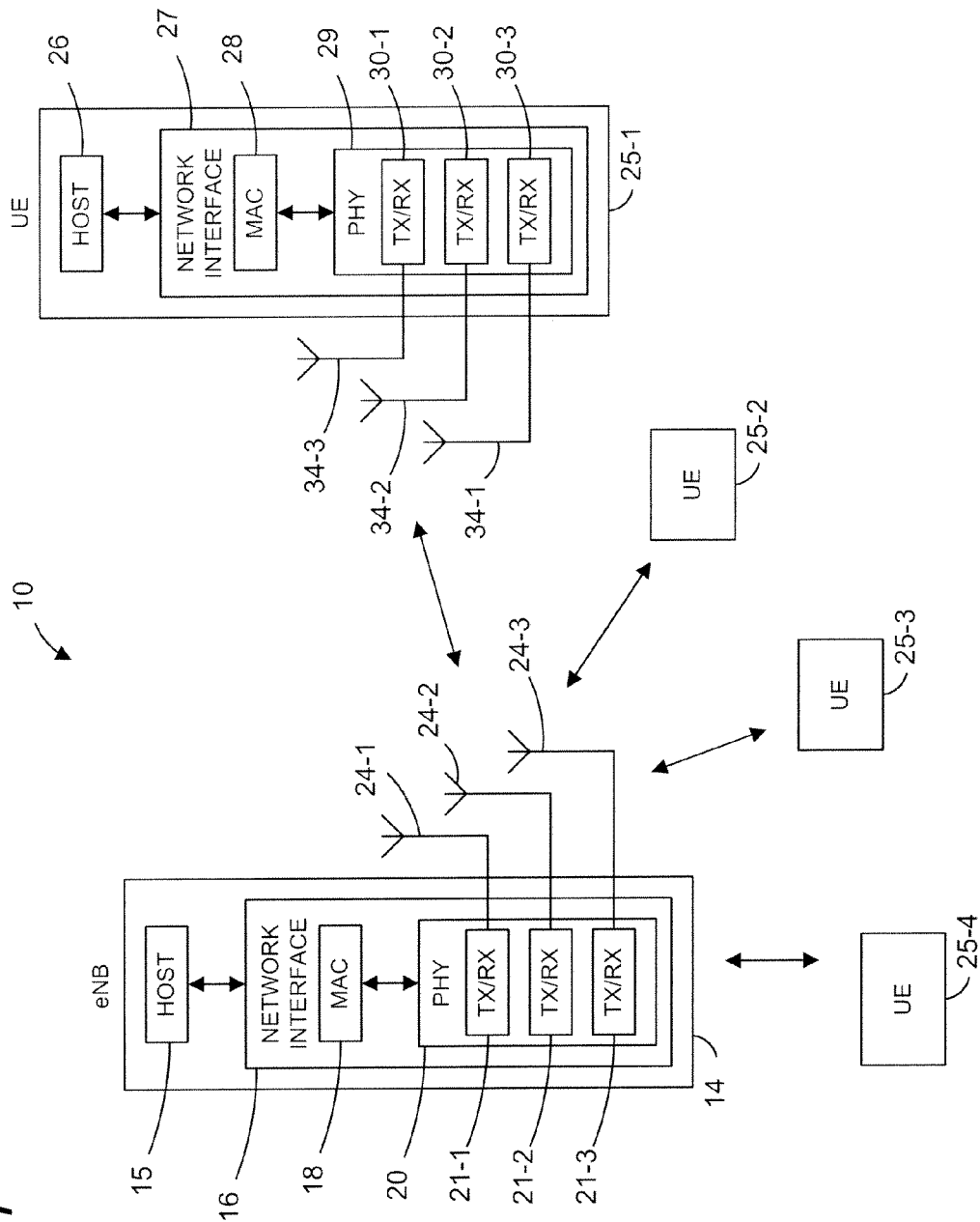
FIG. 1 is a block diagram of an example wireless communication network in which antenna spoofing techniques are utilized, according to an embodiment.

FIG. 1 is a block diagram of an example wireless communication network 10, according to an embodiment. An eNB 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the eNB 14 can include different numbers (e.g., 1, 2, 4, 5, etc.) of transceivers 21 and antennas 24 in other embodiments. Also, in another embodiment, the eNB 14 includes more antennas 24 than transceivers 21, and includes an antenna switch (not shown) to couple the transceivers 21 to different subsets of the antennas 24.

The network 10 includes a plurality of UEs 25. Although four UEs 25 are illustrated in FIG. 1, the network 10 can include different numbers (e.g., 1, 2, 3, 5, 6, etc.) of UEs 25 in various scenarios and embodiments. The UE 25-1 includes a host processor 26 coupled to a network interface 27. The network interface 27 includes a MAC unit 28 and a PHY unit 29. The PHY unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments. Also, in another embodiment, the UE 25-1 includes more antennas 34 than transceivers 30, and includes an antenna switch (not shown) to couple the transceivers 30 to different subsets of the antennas 34.

In various embodiments, one or more of the UEs 25-2, 25-3, and 25-4 has a structure the same as or similar to the client station 25-1.

In various embodiments, one or more of the PHY unit 20 and/or the MAC unit 18 of the eNB 14, the PHY unit 29 and/or the MAC unit 28 of the UE 25-1, and/or PHY units and/or MAC units of the other UEs 25 are configured to utilize "antenna spoofing" techniques described below. For ease of explanation, the UE 25-1 will be described below as utilizing antenna spoofing in communicating with the eNB 14. But in other embodiments, the eNB 14 and/or other UEs 25 additionally or alternatively utilize antenna spoofing.

The term "antenna spoofing", as used herein, generally refers to techniques in which a transmitter with multiple antennas utilizes beamforming to transmit a signal to a receiver when the receiver assumes that transmit beamforming is not being utilized. The receiver is "spoofed" in that, from the point of view of the receiver, the transmitter appears to be transmitting from a single antenna, as one example, or is transmitting from multiple antennas using transmit diversity but not beamforming, as another example. According to some embodiments, the transmitter utilizes knowledge of the reverse channel (i.e., the channel from the receiver to the transmitter) and channel reciprocity to determine a beamforming vector, in some embodiments. Several embodiments of antenna spoofing are described below.

As used herein, the term "transmitter" refers to the communication device that performs antenna spoofing, and the term "receiver" refers to the communication device to which the transmitter transmits signals. Thus, the "receiver" also typically is capable of transmission and the "transmitter" also typically is capable of reception, such as receiving signals transmitted by the "receiver." For example, in some embodiments discussed below, the "receiver" transmits information to the "transmitter."

System Model

An example model of a communication system in the context of antenna spoofing by a UE, according to an embodiment, will first be described. In the model, $N_{t,UE}$ is the number of transmit (Tx) antennas at the UE. $N_{s,UL}$ is the number of uplink (UL) streams, and $N_{s,DL}$ is the number of downlink (DL) streams, where UL refers to transmissions from the UE to the eNB and DL refers to transmissions from the eNB to the UE. $N_{t,eNB}$ is the number of Tx antennas at the eNB, and it is assumed that the number of receive (Rx) antennas at the eNB is also $N_{t,eNB}$, in one embodiment. As merely an example scenario provided for illustrative purposes, the current 3GPP LTE specification specifies $N_{s,UL}=1$, a maximum of $N_{s,DL}$ is 2, and assumes $N_{t,UE}$ is 2 for UL antenna selection. In other scenarios, $N_{s,UL}$, $N_{s,DL}$, and $N_{t,UE}$ have other suitable values.

In the example model, reciprocity between the UL channel and the DL channel is assumed. If the UL MIMO channel is $H_u$ (an $N_{t,eNB} \times N_{t,UE}$ matrix) and the DL MIMO channel is $H_d$ (an $N_{t,UE} \times N_{t,eNB}$ matrix), then channel reciprocity can be represented as $H_u = H_d^T$. Communication channels such as mobile communication are time-varying, and uplink and downlink transmissions may occur at different times, such as with a time-division duplex (TDD) system. Therefore, for reciprocity to hold, the channel generally should be relatively slowly time-varying. The time over which a channel remains relatively constant is sometimes referred to as the coherence time. The coherence time is sometimes defined as the delay δt at which a squared magnitude of an autocorrelation of the impulse response h(t) of the channel drops below a certain fraction (often ½) of the autocorrelation at zero delay. To use DL channel measurements made at time t to estimate the UL channel a t+Δ, then Δ should be shorter than the coherence time to ensure a certain level of performance.

Additionally, for reciprocity to hold, the frequencies at which the UL channel and the DL channel operate should be the overlapping or the channels must be frequency invariant over a range of frequencies spanning both the UL and DL channels.

In transceivers having multiple transmit and receive chains, the responses of the individual transmit chains and receive chains may cause a reciprocal channel to violate reciprocity when considering a composite channel that includes the responses of the transmit and receive chains of the UE and the eNB. Thus, calibration that takes into account the responses of the individual transmit chains and receive chains is utilized, in some embodiments and/or scenarios.

A singular value decomposition (SVD) of the MIMO UL channel is $$H_u = U \Lambda V^* \qquad \text{Equ. 1}$$

where U and V are unitary matrices, Λ is a diagonal matrix with elements $\lambda_1 \geq \ldots \geq \lambda_{N_{t,UE}}$, and * denotes the conjugate transpose operation. Additionally, V has column vectors $v_1, \ldots, v_{N_{t,UE}}$, corresponding $\lambda_1 \geq \ldots \geq \lambda_{N_{t,UE}}$. Further, it is assumed that $$N_{t,UE} \leq N_{t,eNB} \qquad \text{Equ. 2}$$

i.e., that the number of antennas at the eNB is the same as or greater than the number of antennas at the UE. The SVD of the MIMO DL channel is:

$$H_d = V^{*T} \Lambda U^T \qquad \text{Equ. 3}$$

The above-discussed system model is in the context of 3GPP LTE networks. Similar system models for other types of networks such as WiMAX networks, WLAN networks that conform to the IEEE 802.11n Standard, etc., will be apparent to those of ordinary skill in the art in light of the present disclosure and teachings herein.

Antenna Spoofing

Several example methods of antenna spoofing will now be described. These example methods are in the context of a UE utilizing beamforming to transmit to an eNB. In other embodiments, however, similar methods are in the context of an eNB utilizing beamforming to transmit to a UE. Additionally, the use of the terms eNB and UE is merely for explanatory purposes and does not limit these methods to 3GPP LTE implementations. These techniques can be utilized in other types of wireless communication networks as well, such as WiMAX networks, WLAN networks that conform to the IEEE 802.11n Standard, etc.

Generally, the example antenna spoofing methods involve the UE utilizing one or more beamforming vectors $p_i$ to transmit to the eNB when the eNB expects that the UE is not using beamforming, where i is an index indicating an uplink stream or a sounding signal transmission from a Tx particular antenna, for example. As one example of when the eNB expects that the UE is not using beamforming, the eNB expects that the UE transmits each sounding signal from a single antenna, i.e., the eNB does not expect that the UE uses beamforming to transmit a sounding signal.

Figure 2:
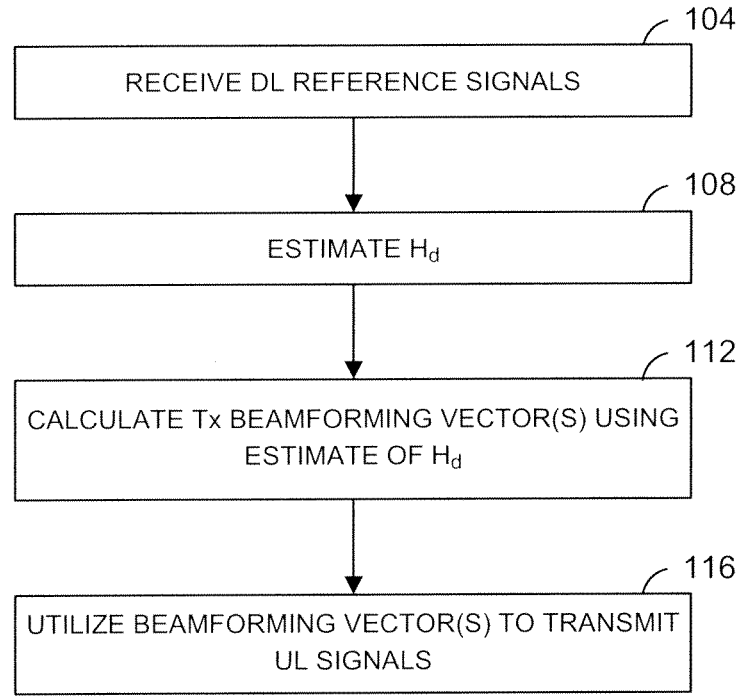
FIG. 2 is an example antenna spoofing method implemented by a user equipment communication device (UE), according to an embodiment.

FIG. 2 is an example antenna spoofing method 100 implemented by a UE, according to an embodiment. The method 100 is utilized by the UE to transmit signals to the eNB using beamforming when the eNB does not expect that the UE is using beamforming, in an embodiment. For example, the eNB assumes the UE is transmitting using a single antenna (e.g., antenna switching) or is transmitting using a diversity technique that does not utilize knowledge of the UL channel or the DL channel, such as delay diversity or frequency offset diversity. In some embodiments, the eNB does not expect that the UE is using beamforming because the eNB has not provided the UE with channel information feedback regarding the UL channel such as channel condition information, signal-to-noise ratio (SNR) information, codebook selection information, etc. According to one embodiment of the method 100, it is assumed that $N_{t,UE} \geq N_c > N_{s,UL}$, where $N_c$ is the number of Tx chains at the UE.

At block 104, the UE receives reference signals from the eNB, such as sounding signals, pilot signals, etc. At block 108, the UE estimates the DL channel $H_d$ based on the reference signals received at block 104.

At block 112, the UE exploits channel reciprocity between UL and DL to calculate one or more transmit beamforming vectors using the DL channel estimate $H_d$. Any suitable technique for calculating the one or more transmit beamforming vectors using the DL channel estimate $H_d$ is utilized. One example technique for implementing block 112 is described with reference to FIG. 3. In one embodiment, the UE calculates $N_{s,UL}$ beamforming vectors $p_i$ for $i=1, \ldots, N_{s,UL}$.

At block 116, the UE utilizes the one or more beamforming vectors to transmit data to the eNB via the UL channel when the eNB does not expect that the UE is using beamforming. In one embodiment, the UE utilizes respective beamforming vectors $p_i$, for $i=1, \ldots, N_{s,UL}$, to transmit the $N_{s,UL}$ UL streams. In one embodiment, the UE utilizes the one or more beamforming vectors to transmit a single stream to the eNB via the UL channel when the eNB assumes the UE is transmitting using a single antenna (e.g., antenna switching). In another embodiment, the UE utilizes the one or more beamforming vectors to transmit a single stream to the eNB via the UL channel when the eNB assumes the UE is transmitting using multiple antennas using a diversity technique that does not utilize knowledge of the UL channel or the DL channel, such as delay diversity or frequency offset diversity. In yet another embodiment, the UE utilizes the one or more beamforming vectors to transmit multiple streams simultaneously to the eNB via the UL channel when the eNB does not expect that the UE is using beamforming.

In some embodiments or scenarios, the method 100 achieves greater UL throughput as compared to UL antenna switching or UL diversity techniques that do not utilize knowledge of the UL channel or the DL channel.

Figure 3:
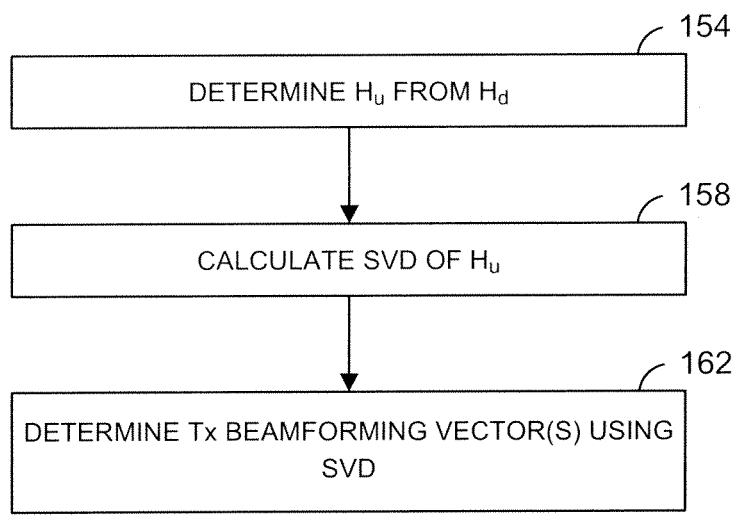
FIG. 3 is an example method for calculating a transmit beamforming vector in the context of antenna spoofing, according to an embodiment.

FIG. 3 is an example method 150 for implementing block 112 of FIG. 2, according to an embodiment. The method 150 exploits channel reciprocity between UL and DL to estimate the UL channel $H_u$, and to use $H_u$ to calculate the one or more beamforming vectors.

At block 154, channel reciprocity is utilized to determine H, from $H_d$. For example, in one embodiment, the UL channel is estimated as $H_u = H_d^T$. In some embodiments, calibration is also utilized to estimate $H_u$.

At block 158, the SVD of $H_u$ is calculated. If $N_{t,UE} > N_c$, for each set of $N_c$ antennas, an SVD of the channel estimate $H_u$ for the set is calculated, and a suitable metric of the $\lambda_i$'s is calculated. Example metrics include a summation of the $\lambda_i$'s, an average of the $\lambda_i$'s, a weighted average of the $\lambda_i$'s, etc. Then, a set of antennas corresponding to the best (e.g., largest) metric is selected, and the SVD corresponding to the selected set is noted.

At block 162, the one or more beamforming vectors are determined using the SVD determined at block 158. If $N_{t,UE} > N_c$, the SVD that is used is the SVD corresponding to the set of antennas having the best (e.g., largest) metric. The block 162 includes determining the one or more beamforming vectors $p_i$ as the first $N_{s,UL}$ column vectors of V, i.e., $p_i = v_i$ for $i=1, \ldots, N_{s,UL}$, according to one embodiment.

Figure 4:
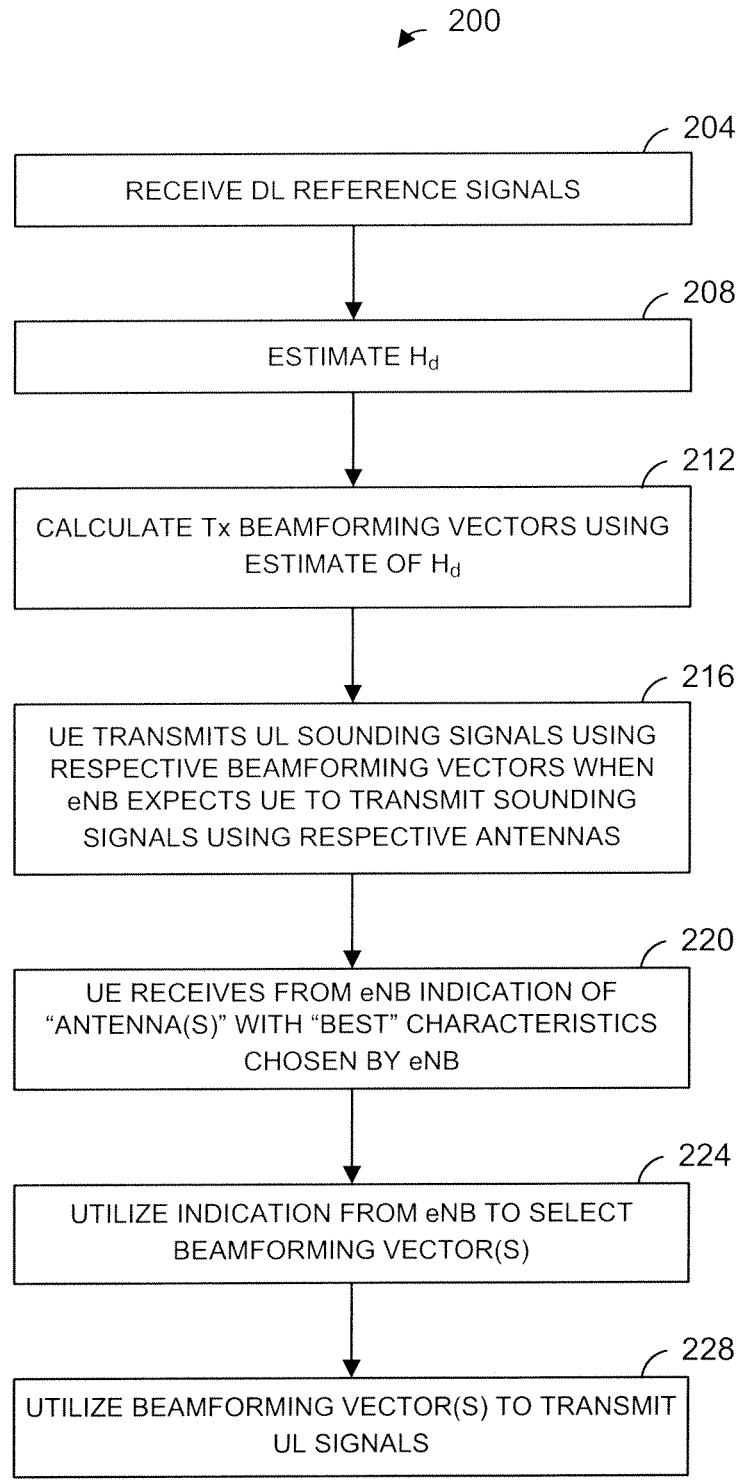
FIG. 4 is another example antenna spoofing method implemented by a UE, according to another embodiment.

FIG. 4 is another example antenna spoofing method 200 implemented by a UE, according to another embodiment. The method 200 is utilized by the UE to select a beamforming vector by using an antenna selection procedure implemented with the eNB. The eNB does not expect that the UE is using beamforming because the eNB assumes that the UE is transmitting each sounding signal using a single antenna. According to one embodiment of the method 200, it is assumed that $N_{t,UE} \geq N_c > N_o \geq N_{s,UL}$, where $N_o$ is the number of sounding opportunities, where a sounding opportunity is an available time slot in which the UE can send training signals from a transmit antenna, in an embodiment. For example, the eNB assigns $N_o$ time slots in which the UE can send sounding signals. In a typical antenna switching procedure, the UE sends a sounding signal via a respective antenna in each assigned sounding time slot.

At block 204, the UE receives reference signals from the eNB, such as sounding signals, pilot signals, etc. At block 208, the UE estimates the DL channel $H_d$ based on the reference signals received at block 204.

At block 212, the UE exploits channel reciprocity between UL and DL to calculate one or more transmit beamforming vectors using the DL channel estimate $H_d$. Any suitable technique for calculating the one or more transmit beamforming vectors using the DL channel estimate $H_d$ is utilized. In some embodiments, block 212 includes calculating the SVD of $H_u$. In these embodiments, if $N_{t,UE} > N_c$, for each set of $N_c$ antennas, an SVD of the channel estimate $H_u$ for the set is calculated, and a suitable metric of the $\lambda_i$'s is calculated. Example metrics include a summation of the $\lambda_i$'s, an average of the $\lambda_i$'s, a weighted average of the $\lambda_i$'s, etc. Then, a set of antennas corresponding to the best (e.g., largest) metric is selected, and the SVD corresponding to the selected set is noted.

In one embodiment, the UE calculates $N_o$ beamforming vectors $p_i$. In embodiments in which the SVD of $H_u$ is calculated, $N_{s,UL}$ beamforming vectors $p_i$ for $i=1, \ldots, N_{s,UL}$, are set to $v_i$. In one embodiment, $p_i = w v_{i-N_{s,UL}} + (1-w) v_i$ for $i = N_{s,UL} + 1, \ldots, N_o$, where $0 \leq w \leq 1$. The parameter w indicates a confidence level of channel knowledge, for example. As the confidence level goes up, w approaches 1, at which beamforming vectors for i=$N_{s,UL}$+1, ..., $N_o$ are redundant.

At block 216, the UE transmits UL sounding signals to the eNB using respective beamforming vectors during time periods in which the eNB expects the UE to transmit the sounding signals using antenna switching, i.e., using respective single antennas. In one embodiment, the UE utilizes respective beamforming vectors $p_i$, for i=1, ..., $N_o$, to transmit the respective UL sounding signals.

Upon receiving the $N_o$ sounding signals, the eNB assumes that each sounding signal was transmitted via a respective single antenna at the UE. The eNB then determines which sounding signal has the "best" characteristics, e.g., highest SNR, and transmits to the UE an indication of the "antenna" that corresponds to the "best" characteristics.

At block 220, the UE receives from the eNB the indication of the "antenna" chosen by the eNB and that corresponds to the "best" characteristics. At block 224, the UE utilizes the indication received at block 220 to select a beamforming vector $p_i$. At block 228, the UE utilizes the beamforming vector selected at block 224 to transmit UL signals.

In some embodiments or scenarios, the method 200 achieves greater UL throughput as compared to traditional antenna switching, while processing at the eNB is the same as compared to antenna switching.

Figure 5:
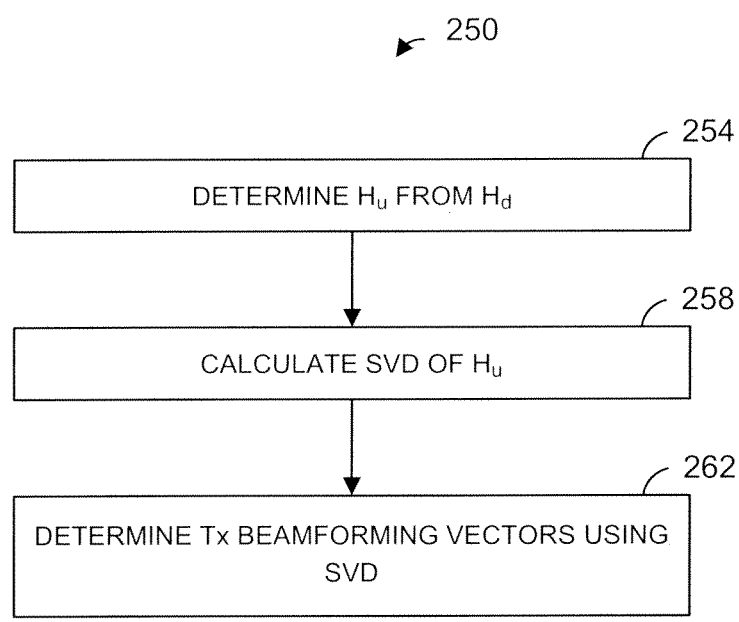
FIG. 5 is another example method for calculating a transmit beamforming vector in the context of antenna spoofing, according to another embodiment.

FIG. 5 is an example method 250 for implementing block 212 of FIG. 4, according to an embodiment. The method 250 exploits channel reciprocity between UL and DL to estimate the UL channel $H_u$, and to use $H_u$ to calculate the one or more beamforming vectors.

At block 254, channel reciprocity is utilized to determine $H_u$ from $H_d$.

For example, in one embodiment, the UL channel is estimated as $H_u=H_d^T$. In some embodiments, calibration is also utilized to estimate $H_u$.

At block 258, the SVD of $H_u$ is calculated. If $N_{t,UE}$>$N_c$, for each set of $N_c$ antennas, an SVD of the channel estimate $H_u$ for the set is calculated, and a suitable metric of the $\lambda_i$'s is calculated. Example metrics include a summation of the $\lambda_i$'s, an average of the $\lambda_i$'s, a weighted average of the $\lambda_i$'s, etc. Then, a set of antennas corresponding to the best (e.g., largest) metric is selected, and the SVD corresponding to the selected set is noted.

At block 262, $N_o$ beamforming vectors are determined using the SVD determined at block 258. $N_{s,UL}$ beamforming vectors $p_i$ for i=1, ..., $N_{s,UL}$, are set to $v_i$. In one embodiment, $p_i$=$wv_{i-N_{s,UL}}$+(1−w)$v_i$, for i=$N_{s,UL}$+1, ..., $N_o$, where 0≦w≦1.

Figure 6:
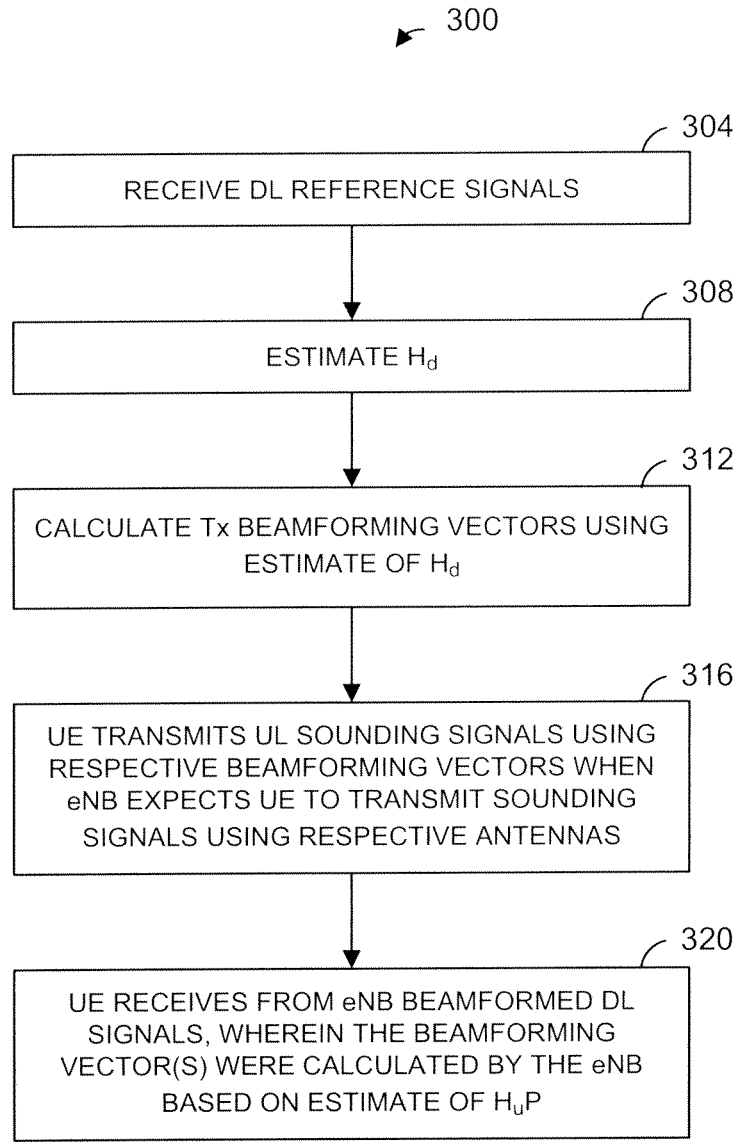
FIG. 6 is yet another example antenna spoofing method implemented by a UE, according to yet another embodiment.

FIG. 6 is yet another example antenna spoofing method 300 implemented by a UE, according to yet another embodiment. The method 300 is utilized by the UE to influence the selection of a beamforming vector by the eNB for DL transmissions to the UE. The method 300 exploits UL sounding for purposes of DL beamforming. The eNB does not expect that the UE is using beamforming because the eNB assumes that the UE is transmitting each sounding signal using a single antenna. According to one embodiment of the method 300, it is assumed that $N_{t,UE}$≧$N_c$>$N_o$≧$N_{s,UL}$.

At block 304, the UE receives reference signals from the eNB, such as sounding signals, pilot signals, etc. At block 308, the UE estimates the DL channel $H_d$ based on the reference signals received at block 304.

At block 312, the UE exploits channel reciprocity between UL and DL to calculate one or more transmit beamforming vectors using the DL channel estimate $H_d$. Any suitable technique for calculating the one or more transmit beamforming vectors using the DL channel estimate $H_d$ is utilized. In some embodiments, block 312 includes calculating the SVD of $H_u$.

In these embodiments, if $N_{t,UE}$>$N_c$, for each set of $N_c$ antennas, an SVD of the channel estimate $H_u$ for the set is calculated, and a suitable metric of the $\lambda_i$'s is calculated. Example metrics include a summation of the $\lambda_i$'s, an average of the $\lambda_i$'s, a weighted average of the $\lambda_i$'s, etc. Then, a set of antennas corresponding to the best (e.g., largest) metric is selected, and the SVD corresponding to the selected set is noted.

In one embodiment, the UE calculates $N_o$ beamforming vectors $p_i$. In embodiments in which the SVD of $H_u$ is calculated, $N_{s,UL}$ beamforming vectors $p_i$ for i=1, ..., $N_{s,UL}$, are set to $v_i$. In one embodiment, $p_i$=$wv_{i-N_{s,UL}}$+(1−w)$v_i$ for i=$N_{s,UL}$+1, ..., $N_o$, where 0≦w≦1. The parameter w indicates a confidence level of channel knowledge, for example. As the confidence level goes up, w approaches 1, at which beamforming vectors for i=$N_{s,UL}$+1, ..., $N_o$ are redundant.

In one embodiment, block 312 comprises the method 250 of FIG. 5.

At block 316, the UE transmits UL sounding signals to the eNB using respective beamforming vectors during time periods in which the eNB expects the UE to transmit the sounding signals using antenna switching, i.e., using respective single antennas. In one embodiment, the UE utilizes respective beamforming vectors $p_i$, for i=1, ..., $N_o$, to transmit the respective UL sounding signals.

Upon receiving the $N_o$ sounding signals, the eNB assumes that each sounding signal was transmitted via a respective single antenna at the UE. In other words, the eNB assumes that it has received each sounding signal via $H_u e_i$, where $e_i$ is a vector with the i-th component set to one and all other components set to zero. The eNB has in fact, however, received each sounding signal via $H_u p_i$. Thus, the eNB estimates the UL channel as $H_u'$=$H_u$P, where P is a matrix having the $N_o p_i$ column vectors. Next the eNB exploits reciprocity and estimates the DL channel as $H_d'$=($H_u$P)$^T$=$P^T H_d$. Then, the eNB uses $H_d'$ to calculate one or more beamforming vectors. For example, the eNB utilizes the SVD of $H_d'$ to determine one or more beamforming vectors in a manner similar to the techniques described above, in one embodiment. As another example, the eNB utilizes the Tomlinson-Harashima precoding technique, in another embodiment. In any case, the eNB assumes that it is using $H_u$ as opposed to $H_u'$.

At block 320, the UE receives from the eNB beamformed DL signals, wherein the DL signals are beamformed using the one or more beamforming vectors calculated by the eNB using $H_u$P.

In some embodiments or scenarios, the method 300 achieves the same beamforming and/or performance as when the eNB has full knowledge of $H_d$. For example, in some embodiments or scenarios compared with a full sounding technique, the method 300 achieves the same performance with less overhead, i.e., less UL sounding transmissions. Also, in some embodiments or scenarios, compared with antenna-by-antenna sounding, the method 300 achieves better performance with the same number of sounding transmissions.

Figure 7:
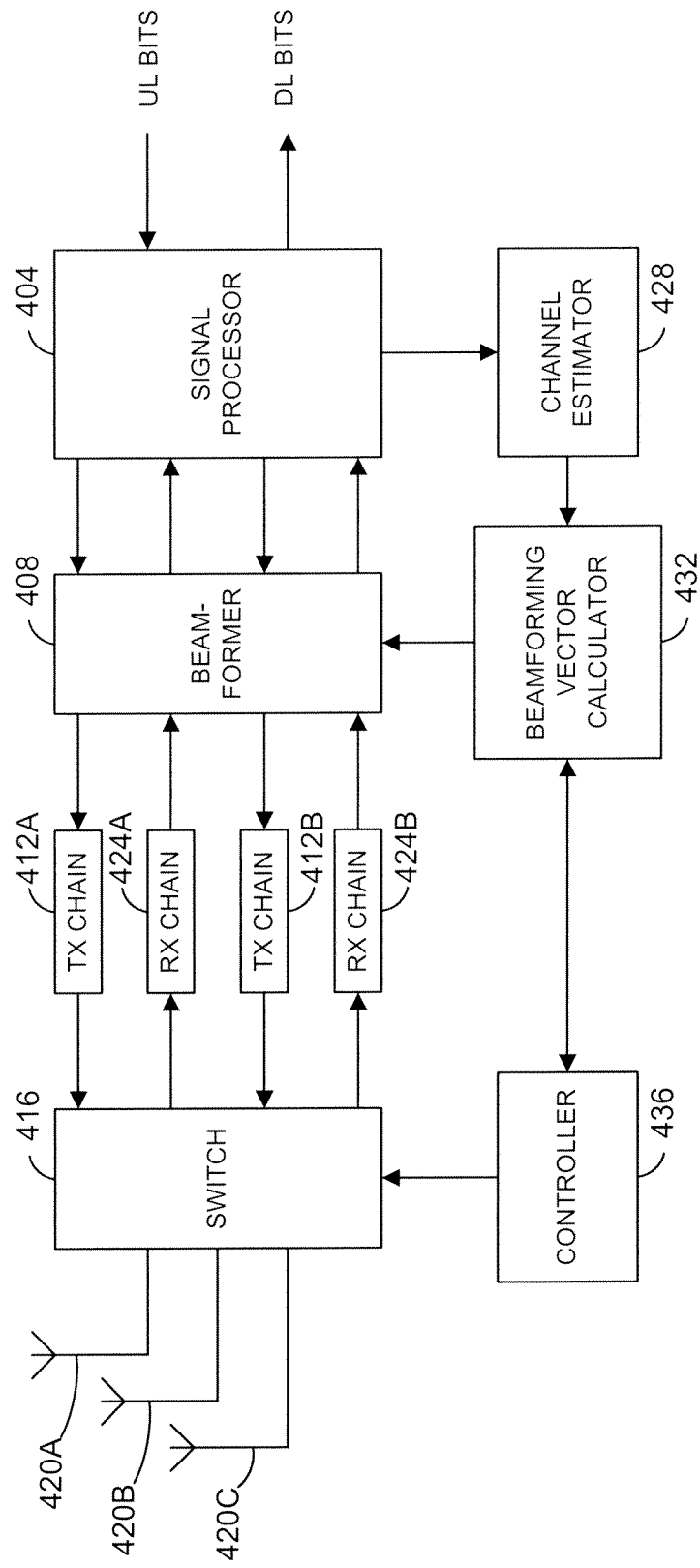
FIG. 7 is an example physical layer unit of a UE for implementing antenna spoofing, according to an embodiment.

FIG. 7 is a block diagram of an example PHY unit 400 for a UE that implements one or more of the example methods of FIGS. 2-6, according to an embodiment. The PHY unit 400 includes a signal processor 404 that receives bits for transmission via the UL channel and performs various operations such as one or more of encoding, interleaving, stream parsing, mapping to bits to symbols, etc. Multiple outputs of the signal processor 404 are provided to a beamforming unit 408 that utilizes a beamforming network to apply a beamforming vector to signals to be transmitted via the UL channel. A plurality of Tx chains 412 upconvert the beamformed signals to radio frequency (RF) for transmission. An antenna switch 416 switches the outputs of the Tx chains 412 between a larger number of antennas 420.

Similarly, the antenna switch 416 switches the antennas 420 between a smaller number of receive (Rx) chains 424. The Rx chains 424 downcovert DL signals from RF. If Rx beamforming is utilized, the beamformer 408 applies Rx beamforming to the outputs of the Rx chains 424. The signal processor 404 performs operations on outputs of the beamforming unit 408 corresponding to DL signals, such as symbol detection, mapping symbols to bits, decoding, etc., to generate a DL bit stream. If the number of antennas 420 is the same as the number of Tx chains and the number of Rx chains, the antenna switch 416 is omitted, in some embodiments.

A channel estimator 428 is coupled to the signal processor 404. The channel estimator 428 is configured to generate an estimate of the DL channel $H_d$ based on reference signals received from the eNB via the DL channel. Additionally, the channel estimator 428 is configured to utilize channel reciprocity to determine $H_u$ from $H_d$. For example, in one embodiment, the channel estimator 428 is configured to estimate $H_u$ as $H_d^T$. In some embodiments, the channel estimator 428 also utilizes calibration to estimate $H_u$ based on $H_d$.

A beamforming vector calculator 432 is coupled to the channel estimator 428 and the beamforming unit 408. The beamforming vector calculator 432 is configured to calculate beamforming vectors based on $H_u$, and to supply the beamforming vectors to the beamforming unit 408. A controller 436 is coupled to the antenna switch 416 and the beamforming vector calculator 432. The controller 436 is configured to control which antennas 420 are used for a particular transmission, and to control which beamforming vector is supplied to the beamforming unit 408 for a particular transmission.

In one embodiment, the PHY unit 400 is configured to implement the method 100 of FIG. 2. For example, the channel estimator 428 estimates $H_d$ based on DL reference signals received by the PHY unit 400. Also, the channel estimator 428 and the beamforming vector calculator 432 calculate one or more beamforming vectors using an estimate of $H_d$. The controller 436 causes the beamforming vector calculator 432 to supply the calculated beamforming vector(s) to the beamforming unit 408, which uses the beamforming vector(s) to beamform during transmission of UL signals.

In one embodiment, the PHY unit 400 is configured to implement the method 150 of FIG. 3. For example, the channel estimator 428 determines $H_u$ from $H_d$. The beamforming vector calculator 432 calculates SVD of $H_u$. The beamforming vector calculator 432 calculates one or more beamforming vectors using the SVD.

Similarly, the PHY unit 400 is configured to implement the method 200 of FIG. 4, in one embodiment. For example, the controller 436 causes the PHY unit 400 to transmit UL sounding signals using respective beamforming vectors calculated by the channel estimator 428 and the beamforming vector calculator 432. Also, the controller 436 receives the indication from the eNB (block 220) and uses the indication to control the beamforming vector calculator 432 to provide the appropriate beamforming vector to the beamforming unit 408 for transmission of UL signals.

In a similar manner, the PHY unit 400 is configured to implement the methods of FIGS. 5 and 6.

In other embodiments, the PHY unit 29 (FIG. 1) is configured to implement one or more of the methods of FIGS. 2-6.

In other embodiments, methods similar to those discussed above are implemented by the eNB. In these embodiments, the PHY unit 20 (FIG. 1) is configured to implement one or more of the methods. Additionally, in one embodiment, the PHY unit 20 has a structure similar to the PHY unit of FIG. 7.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for utilizing beamforming in a wireless communication system, the method comprising:
   receiving reference signals via a first communication channel from a first communication device to a second communication device;
   generating an estimate of the first communication channel using the received reference signals;
   calculating one or more transmit beamforming vectors using the estimate of the first communication channel; and
   utilizing the one or more transmit beamforming vectors to transmit signals via a second communication channel from the second communication device to the first communication device, wherein the first communication device processes the signals transmitted from the second communication device to the first communication device according to a model H $e_i$, where H is a matrix representing the second communication channel, and where $e_i$ is a vector with all components of $e_i$, except an $i^{th}$ component of $e_i$, being equal to zero.

2. A method according to claim 1, wherein the estimate of the first communication channel is an estimate corresponding to a set of receive antennas;
   wherein the method further comprises:
      generating other estimates of the first communication channel corresponding to other sets of receive antennas; and
      selecting one of the estimates for calculation of the one or more transmit beamforming vectors.

3. A method according to claim 1, wherein calculating the one or more transmit beamforming vectors using the estimate of the first communication channel comprises:

determining an estimate of the second communication channel using the estimate of the first communication channel; and calculating the one or more transmit beamforming vectors using the estimate of the second communication channel.

4. A method according to claim 3, wherein calculating the one or more transmit beamforming vectors using the estimate of the second communication channel comprises:

calculating a singular value decomposition (SVD) of a matrix corresponding to the estimate of the second communication channel; and determining the one or more transmit beamforming vectors using the SVD.

5. A method according to claim 4, wherein determining the one or more transmit beamforming vectors using the SVD comprises determining the one or more transmit beamforming vectors using vectors from a V matrix from the SVD.

6. A method according to claim 1, wherein utilizing the one or more transmit beamforming vectors comprises utilizing the one or more transmit beamforming vectors to transmit a plurality of streams simultaneously.

7. An apparatus for utilizing beamforming in a wireless communication system, the apparatus comprising:

a channel estimator to generate an estimate of a first communication channel from a first communication device to a second communication device that includes the apparatus, the channel estimator to generate the estimate of the first communication channel using reference signals received from the first communication device via the first communication channel;

a transmit beamforming calculator to calculate one or more beamforming vectors based on an output of the channel estimator;

a beamforming unit to utilize the one or more transmit beamforming vectors on signals to be transmitted via a second communication channel from the second communication device to the first communication device; and a controller to cause the beamforming unit to utilize the one or more transmit beamforming vectors on signals to be transmitted via the second communication channel, wherein the first communication device processes the signals transmitted from the second communication device to the first communication device according to a model H $e_i$, where H is a matrix representing the second communication channel, and where $e_i$ is a vector with all components of $e_i$, except an $i^{th}$ component of $e_i$, being equal to zero.

8. An apparatus according to claim 7, wherein the channel estimator is configured to generate a plurality of estimates of the first communication channel using different sets of receive antennas and to select one of the estimates for calculation of the one or more transmit beamforming vectors.

9. An apparatus according to claim 7, wherein the channel estimator is configured to determine an estimate of the second communication channel using the estimate of the first communication channel; and wherein the transmit beamforming calculator is configured to calculate the one or more beamforming vectors based on the estimate of the second communication channel.

10. An apparatus according to claim 9, wherein the transmit beamforming calculator is configured to:

calculate a singular value decomposition (SVD) of a matrix corresponding to the estimate of the second communication channel, and determine the one or more transmit beamforming vectors using the SVD.

11. An apparatus according to claim 10, wherein the transmit beamforming calculator is configured to determine the one or more transmit beamforming vectors using vectors from a V matrix from the SVD.

12. An apparatus according to claim 7, wherein the controller is configured to cause the beamforming unit to utilize a plurality of transmit beamforming vectors to transmit a plurality of sounding signals via the second communication channel.

13. An apparatus according to claim 12, wherein the controller is configured to:

select one of the plurality of transmit beamforming vectors based on an indication received from the first communication device, the indication corresponding to one of the plurality of sounding signals, and cause the beamforming unit to utilize the selected transmit beamforming vector to transmit signals via the second communication channel.

14. A method for utilizing beamforming in a wireless communication system, the method comprising:

receiving reference signals via a first communication channel from a first communication device to a second communication device;

generating an estimate of the first communication channel using the received reference signals;

calculating a plurality of transmit beamforming vectors using the estimate of the first communication channel;

utilizing each one of the plurality of transmit beamforming vectors to transmit a respective sounding signal via a second communication channel from the second communication device to the first communication device;

receiving an antenna indication from the first communication device, wherein the antenna indication corresponds to one of the sounding signals;

selecting, based on the antenna indication, one of the plurality of transmit beamforming vectors; and utilizing the selected transmit beamforming vector to transmit signals via the second communication channel.

15. A method according to claim 14, wherein the estimate of the first communication channel is an estimate corresponding to a set of receive antennas;

wherein the method further comprises:

generating other estimates of the first communication channel corresponding to other sets of receive antennas; and selecting one of the estimates for calculation of the plurality of transmit beamforming vectors.

16. A method according to claim 14, wherein calculating the one or more transmit beamforming vectors using the estimate of the first communication channel comprises:

determining an estimate of the second communication channel using the estimate of the first communication channel; and calculating the plurality of transmit beamforming vectors using the estimate of the second communication channel.

17. A method according to claim 16, wherein calculating the plurality of transmit beamforming vectors using the estimate of the second communication channel comprises:

calculating a singular value decomposition (SVD) of a matrix corresponding to the estimate of the second communication channel; and determining the plurality of transmit beamforming vectors using the SVD.

18. A method according to claim 17, wherein determining the one or more transmit beamforming vectors using the SVD comprises determining the one or more transmit beamforming vectors using vectors from a V matrix from the SVD.

* * * * *